United States Patent [19]

White

[11] 4,320,023
[45] Mar. 16, 1982

[54] ANTIFREEZE FORMULATION USEFUL FOR RETARDING PRECIPITATION OF ALUMINUM CORROSION PRODUCTS IN THE COOLING SYSTEMS OF INTERNAL COMBUSTION ENGINES

[75] Inventor: Preston S. White, Corpus Christi, Tex.

[73] Assignee: Conoco Inc., Ponca City, Okla.

[21] Appl. No.: 213,257

[22] Filed: Dec. 5, 1980

Related U.S. Application Data

[63] Continuation of Ser. No. 69,006, Aug. 23, 1979, abandoned.

[51] Int. Cl.³ ............................................. C09K 5/00
[52] U.S. Cl. ....................................... 252/75; 252/180
[58] Field of Search ................................ 252/75, 180

[56] References Cited

U.S. PATENT DOCUMENTS

| | | | |
|---|---|---|---|
| 3,214,454 | 10/1965 | Blaser et al. | 252/180 X |
| 3,738,806 | 6/1973 | Feiler | 252/389 A X |
| 3,769,220 | 10/1973 | Willard et al. | 252/75 |
| 3,900,370 | 8/1978 | Germscheid et al. | 148/6.15 R X |
| 3,935,125 | 1/1976 | Jacob | 252/389 A |
| 4,046,570 | 9/1977 | Fierens et al. | 430/418 |

FOREIGN PATENT DOCUMENTS 2022777  11/1971  Fed. Rep. of Germany.

OTHER PUBLICATIONS

Radiator Reporter & Pricing Guide, vol. 6, No. 3, Mar. 1978.

Primary Examiner—Mayer Weinblatt
Attorney, Agent, or Firm—Robert B. Coleman, Jr.

[57] ABSTRACT

Precipitation of aluminum corrosion products from phosphate-borate ethylene glycol based antifreeze formulations is retarded by incorporating in the antifreeze a precipitation retarding amount of alkylene diphosphonic acid, e.g., 1-hydroxyethylidene-1,1-diphosphonic acid.

6 Claims, No Drawings

ANTIFREEZE FORMULATION USEFUL FOR RETARDING PRECIPITATION OF ALUMINUM CORROSION PRODUCTS IN THE COOLING SYSTEMS OF INTERNAL COMBUSTION ENGINES

This is a continuation of application Ser. No. 69,006, filed Aug. 23, 1979, now abandoned.

BACKGROUND OF THE INVENTION

Ethylene glycol based antifreeze formulations may be inhibited with inorganic additives, e.g., alkali metal borates and phosphates, which phosphate-borate type ethylene glycol based antifreeze formulations have excellent corrosion preventive properties when used in cooling systems associated with conventional cast iron internal combustion engines. In efforts to reduce weight and maximize fuel efficiency, there is a trend toward use of aluminum engine components, particularly aluminum cylinder heads.

It has been observed that when phosphate-borate ethylene glycol based antifreeze formulations are used in cooling systems of internal combustion engines having aluminum components, e.g. cylinder heads, aluminum corrosion products reach a solubility maximum in the antifreeze and precipitate out in the radiator section of the cooling system resulting in engine overheating due to diminished heat transfer in the radiator.

DESCRIPTION OF THE INVENTION

In accordance with this invention it has been found that precipitation of aluminum corrosion products from phosphate-borate ethylene glycol based antifreeze formulations can be retarded by incorporating in the antifreeze formulation a precipitation retarding amount of alkylene diphosphonic acid.

Alkylene disphosphonic acids suitable for use as aluminum corrosion product precipitation retardants in accordance with the invention are known compounds and are described, for example in U.S. Pat. No. 3,214,454 and U.S. Pat. No. 3,297,578. The alkylenephosphonic acids are those represented by the general formula;

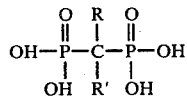

wherein R is hydrogen or $C_1$ to $C_4$ alkyl; and R' is hydrogen, hydroxyl amino or $C_1$ to $C_4$ alkyl. Some specific examples of alkylene disphosphonic acids contemplated for use in accordance with the invention are methylene disphosphonic acid; 1,1-ethylidenediphosphonic acid; isopropylenediphosphonic acid; 1-hydroxyethylidene-1,1-diphosphonic acid; 1-hydroxy propylidene disphosphonic acid; butylidene diphosphonic acid; 1-aminoethylene-1,1-disphosphonic acid; 1-aminopropane-1,1-diphosphonic acid or mixtures thereof. The water soluble salts of these acids, e.g. alkali metal or alkaline earth metal salts may also be used. Of the foregoing, 1-hydroxyethylidene-1,1-diphosphonic acid is particularly preferred.

The concentration of alkylene diphosphonic acid in the phosphateborate ethylene glycol based antifreeze formulation may vary over a wide range, for example, from about 50 to 500 parts, preferably from 250 to about 500 parts by weight disphosphonic acid per million parts by weight antifreeze formulation. Concentrations of disphosphonic acid in excess of about 500 parts per million are not recommended since it has been observed that too high a concentration of diphosphonic acid increases the turbidity of the antifreeze and could cause precipitation of typically used antifreeze inhibitors.

As used herein phosphate-borate ethylene glycol based antifreeze formulations are those wherein ethylene glycol is the major constitutent of the formulation, the corrosive action of the ethylene glycol being largely inhibited by the inclusion of inhibiting amounts of inorganic borate and phosphate compounds, e.g. hydrated sodium tetraborate (borax) and trisodium phosphate. Precise formulations are of course proprietary vis-a-vis particular antifreeze manufactures, and may contain in addition to borate and phosphate compounds, other additives, e.g. sodium metasilicate, sodium nitrate and sodium hydroxide. Regardless of the precise formulation phosphate-borate ethylene glycol based antifreeze is an art-recognized term and would, it is believed, have a clear unambiguous connotation to one conversant with the antifreeze art.

The invention is further illustrated, but is not intended, to be limited by the following example.

EXAMPLE (A) An aqueous antifreeze solution was prepared by diluting Zerex® 701 (a commercially available phosphate-borate ethylene glycol based antifreeze formulation produced by PPG Industries, Inc.) with ASTM standard corrosive water in a ratio of 50 parts by volume Zerex® 701 to 50 parts by volume corrosive water.

The ASTM standard corrosive water contains specified concentration of chloride, sulfate and carbonate ions and is commonly used in the evaluation of antifreeze formulations since it offers the advantage of a standardized water source for solution of antifreeze concentrates.

(B) A closed loop heat rejection fouling test apparatus was used to evaluate surface fouling by aluminum corrosion products in the antifreeze solution prepared in part A and in the antifreeze solution of part A to which had been added 500 parts by weight per million parts by weight of Zerex® 701 of 1-hydroxy-1,1-ethylidene diphosphonic acid (HEDP). The test apparatus comprised a coolant reservoir the sides and top of which were constructed of mild steel with a bottom of aluminum alloy 319. Antifreeze solution was added to the coolant reservoir and circulated via pump means upwardly through a length of vertically disposed 0.75 inch O.D. Pyrex® glass tubing having concentrically disposed therein a length of 0.25 inch O.D. thin-walled brass tubing, tap water being continuously flowed through the interior of the brass tubing, the antifreeze solution continuously flowed through the annular space between the inner surface of the glass tubing and the outer surface of the brass tubing and back to the reservoir.

The antifreeze solution in the reservoir was heated by a furnace heater which transferred heat to the solution via the aluminum bottom of the reservoir, the temperature of the test solution in the reservoir being maintained in the range of 195 to 200° F. Antifreeze solution was circulated through the test apparatus at a constant rate of about one liter per minute throughout the test period. The flow of tap water through the interior of the brass tube was monitored so as to maintain a temperature drop of 15° F. between the inlet and outlet of the antifreeze solution flowing over the outer surface of the brass tube.

The extent of aluminum corrosion product precipitation from the antifreeze solution was measured by calculating the decrease in the heat transfer coefficient of the surface of the brass tube in contrast with the antifreeze solution as follows:

$$U = \frac{Mw(Tw_2 - Tw_1)}{A \times T}$$

wherein

U = heat transfer coefficient, $$\frac{BTU}{hr\text{-}ft^2\text{-}°F.}$$

Mw = mass flow rate of water through the brass tube, lb/hr;

$Tw_1$ = water temperature at inlet to the brass tube, °F;

$Tw_2$ = water temperature at outlet of the brass tube, °F;

A = surface area of brass tube in contact with the antifreeze solution; and $$\Delta T = \frac{(Tg_1 - Tw_2) - (Tg_2 - Tw_1)}{\ln \frac{(Tg_1 - Tw_2)}{(Tg_2 - Tw_1)}}$$

wherein $Tg_1$ = antifreeze solution temperature at inlet to the brass tube, °F; and $Tg_2$ = antifreeze solution temperature at outlet of the brass tube, °F.

Heat transfer data vs. time for two test runs under identical conditions using the antifreeze solution of part (A) and the antifreeze solution of part (A) containing 500 ppm by weight on weight of Zerex ® 701 of HEDP are summarized as follows:

| Time, hrs. | U, BTU/hr-ft²-°F. | |
|---|---|---|
| | Soln A | Soln A + HEDP |
| 50 | 200 | 305 |
| 100 | 170 | 302 |
| 150 | 108 | 300 |
| 200 | — | 298 |
| 250 | — | 295 |
| 300 | — | 292 |

| Time, hrs. | U, BTU/hr-ft²-°F. | |
|---|---|---|
| | Soln A | Soln A + HEDP |
| 350 | — | 290 |

Although the invention has been illustrated with particular reference to specific embodiments thereof, it is to be understood that it is not intended that the invention be so limited except as defined by the appended claims.

I claim:

1. A phosphate-borate ethylene glycol based antifreeze formulation especially useful for retarding precipitation of aluminum corrosion products in the cooling system of an internal combustion engine said antifreeze formulation containing from about 50 to about 500 parts by weight per million parts by weight of antifreeze of alkylene diphosphonic acid represented by the formula:

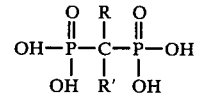

wherein R is hydrogen or $C_1$ to $C_4$ is alkyl; and R' is hydrogen, hydroxyl, amino or $C_1$ to $C_4$ alkyl.

2. The antifreeze formulation of claim 1 containing from about 250 to about 500 parts by weight per million parts by weight of antifreeze of alkylene diphosphonic acid.

3. The antifreeze formulation of claim 1 wherein the alkylene diphosphonic acid is 1-hydroxyethylidene-1,1-diphosphonic acid.

4. A method of retarding precipitation of aluminum corrosion products in cooling systems associated with internal combustion engines having aluminum components in contact with phosphate-borate based antifreeze by incorporating in the antifreeze from about 50 to about 500 parts by weight per million parts by weight of antifreeze of alkylene diphosphonic acid represented by the formula:

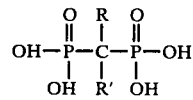

wherein R is hydrogen or $C_1$ to $C_4$ alkyl; and R' is hydrogen, hydroxyl, amino or $C_1$ to $C_4$ alkyl.

5. The method of claim 4 wherein the antifreeze contains from about 250 to about 500 parts by weight per million parts of antifreeze of alkylene diphosphonic acid.

6. The method of claim 4 wherein the alkylene diphosphonic acid is 1-hydroxyethylidene-1,1-diphosphonic acid.

* * * * *